(12) United States Patent
West

(10) Patent No.: US 11,766,828 B2
(45) Date of Patent: Sep. 26, 2023

(54) METHOD OF MANUFACTURING FOLDED STRUCTURE WITH ADDITIVE FEATURES

(71) Applicant: SPIRIT AEROSYSTEMS, INC., Wichita, KS (US)

(72) Inventor: Randall Ray West, Wichita, KS (US)

(73) Assignee: SPIRIT AEROSYSTEMS, INC., Wichita, KS (US)

( * ) Notice: Subject to any disclaimer, the term of this patent is extended or adjusted under 35 U.S.C. 154(b) by 423 days.

(21) Appl. No.: 16/929,195

(22) Filed: Jul. 15, 2020

(65) Prior Publication Data
US 2022/0016834 A1    Jan. 20, 2022

(51) Int. Cl.
*B29C 64/188* (2017.01)
*F02C 7/20* (2006.01)
(Continued)

(52) U.S. Cl.
CPC .......... *B29C 64/188* (2017.08); *B21D 39/028* (2013.01); *F02C 7/20* (2013.01);
(Continued)

(58) Field of Classification Search
CPC ........ B21D 47/01; B21D 39/028; B21D 5/00; B21D 47/04; B29C 64/188
See application file for complete search history.

(56) References Cited

U.S. PATENT DOCUMENTS 3,355,266 A * 11/1967 O'Brien ................. B21D 7/028
428/602
3,890,108 A     6/1975  Welsh
(Continued)

FOREIGN PATENT DOCUMENTS

DE      102014101907 A1 *  8/2015  ............ B22F 3/1055
DE      102015118607 A1 *  5/2017
(Continued)

OTHER PUBLICATIONS

DE-102015118607-A1 machine translation (Year: 2017).*
(Continued)

*Primary Examiner* — Michael W Hotchkiss
(74) *Attorney, Agent, or Firm* — HOVEY WILLIAMS LLP

(57) ABSTRACT

A method of manufacturing a multi-sided or otherwise relatively three-dimensional formed structure for, e.g., an aerospace vehicle. A relatively planar base structure is constructed using a first construction technique. Features (e.g., ribs) are incorporated into the base structure using a second construction technique (e.g., additive or subtractive manufacturing) to create an intermediate structure. The intermediate structure is folded along fold-lines or otherwise physically formed to create the formed structure, such that some of the features are located within an internal space defined by the formed structure. Joints between the sides of the formed structure are welded, fastened, or otherwise secured. Separately constructed additional elements (e.g., bulkheads) may be incorporated into the structure. A close-out element may be added to the formed structure to further define and close the internal space. Throughout the process, the structures, features, and elements may be refined to desired tolerances.

4 Claims, 6 Drawing Sheets

(51) Int. Cl.
*F16B 5/00* (2006.01)
*B21D 39/02* (2006.01)
*B33Y 10/00* (2015.01)
*B21D 5/16* (2006.01)

(52) U.S. Cl.
CPC ............... *F16B 5/00* (2013.01); *B21D 5/16* (2013.01); *B33Y 10/00* (2014.12); *F05D 2230/232* (2013.01); *F05D 2230/31* (2013.01)

(56) References Cited

U.S. PATENT DOCUMENTS

| | | | | |
|---|---|---|---|---|
| 5,042,711 | A * | 8/1991 | Iskenderian | B23K 20/04 219/102 |
| 5,262,220 | A * | 11/1993 | Spriggs | E04C 2/34 244/119 |
| 6,726,259 | B2 | 4/2004 | Kettler | B21D 47/01 100/80 |
| 7,007,989 | B2 * | 3/2006 | Yoon | B60R 19/18 293/122 |
| 7,440,874 | B2 * | 10/2008 | Durney | B21D 5/00 703/2 |
| 8,312,754 | B2 | 11/2012 | Lewis et al. | |
| 8,438,893 | B2 * | 5/2013 | Durney | B65D 7/08 72/332 |
| 8,505,258 | B2 * | 8/2013 | Durney | B21D 5/00 493/356 |
| 8,864,216 | B2 * | 10/2014 | Nagwanshi | B60R 19/22 296/187.03 |
| 8,936,164 | B2 * | 1/2015 | Durney | H02S 20/30 136/251 |
| 9,114,587 | B2 | 8/2015 | Lewis et al. | |
| 9,849,505 | B2 * | 12/2017 | Anderseck | B22D 11/04 |
| 10,160,031 | B2 * | 12/2018 | Higai | B21D 39/02 |
| 10,486,749 | B2 * | 11/2019 | Kim | B62D 25/04 |
| 10,703,312 | B2 * | 7/2020 | Johnson | B21D 53/88 |
| 10,730,634 | B2 * | 8/2020 | Colmagro | B64F 5/10 |
| 10,751,837 | B2 * | 8/2020 | Garcia | B23K 26/342 |
| 10,814,994 | B2 * | 10/2020 | Colmagro | B64D 27/20 |
| 10,850,329 | B2 * | 12/2020 | Tenhaeff | B62D 21/11 |
| 11,072,844 | B2 * | 7/2021 | Weykamp | C22F 1/053 |
| 2002/0140239 | A1 * | 10/2002 | Kettler | B60R 19/18 293/102 |
| 2007/0262128 | A1 * | 11/2007 | Durney | B62D 25/14 229/132 |
| 2008/0001434 | A1 * | 1/2008 | Henkelmann | B62D 29/005 296/187.12 |
| 2008/0054683 | A1 * | 3/2008 | Takeda | B62D 21/152 296/203.01 |
| 2008/0187427 | A1 * | 8/2008 | Durney | B21D 51/52 414/800 |
| 2014/0151497 | A1 * | 6/2014 | Weir | B64D 27/26 244/54 |
| 2014/0203592 | A1 * | 7/2014 | Nagwanshi | B62D 29/004 293/121 |
| 2014/0363299 | A1 * | 12/2014 | Marchal | D03D 25/005 264/258 |
| 2017/0106990 | A1 * | 4/2017 | Journade | B64D 27/26 |
| 2017/0203355 | A1 * | 7/2017 | Satoh | B23K 26/3576 |
| 2017/0327157 | A1 * | 11/2017 | Jaunasse | B29C 70/085 |
| 2018/0304341 | A1 * | 10/2018 | Frost | B21C 23/142 |
| 2018/0362087 | A1 * | 12/2018 | Kodama | B62D 25/082 |
| 2018/0369897 | A1 * | 12/2018 | Galceran | B21D 53/88 |
| 2019/0127074 | A1 * | 5/2019 | Colmagro | B64D 27/20 |
| 2019/0381603 | A1 * | 12/2019 | Lan | B22F 10/38 |
| 2020/0156134 | A1 * | 5/2020 | Sachdev | B21D 5/008 |

FOREIGN PATENT DOCUMENTS

| | | | | |
|---|---|---|---|---|
| WO | WO-2015015122 | A1 * | 2/2015 | ............ B29B 11/16 |
| WO | WO-2015018871 | A1 * | 2/2015 | ............ B21D 11/08 |

OTHER PUBLICATIONS

WO-2015018871-A1 machine translation (Year: 2015).*
DE-102014101907-A1 machine translation (Year: 2015).*
WO2015015122A1 Machine Translation (Year: 2015).*

* cited by examiner

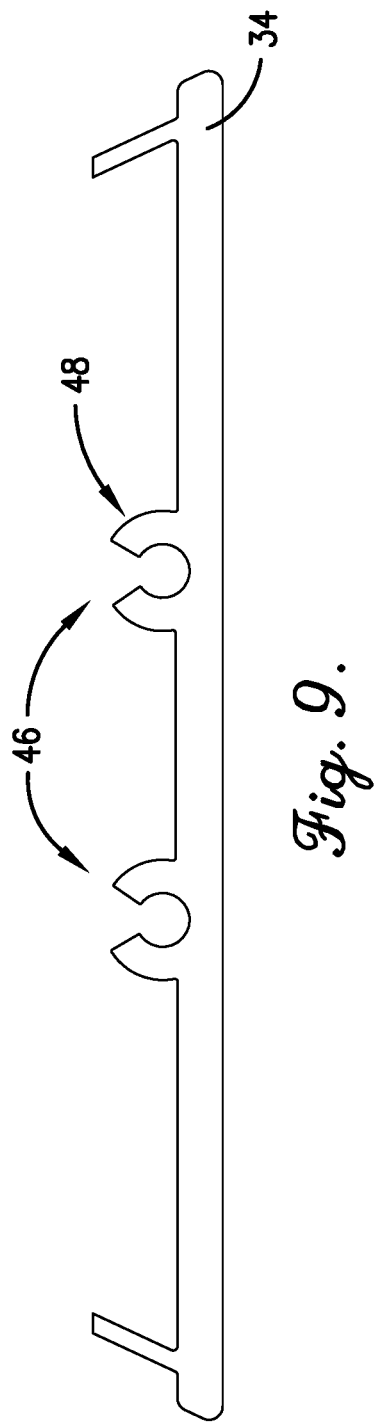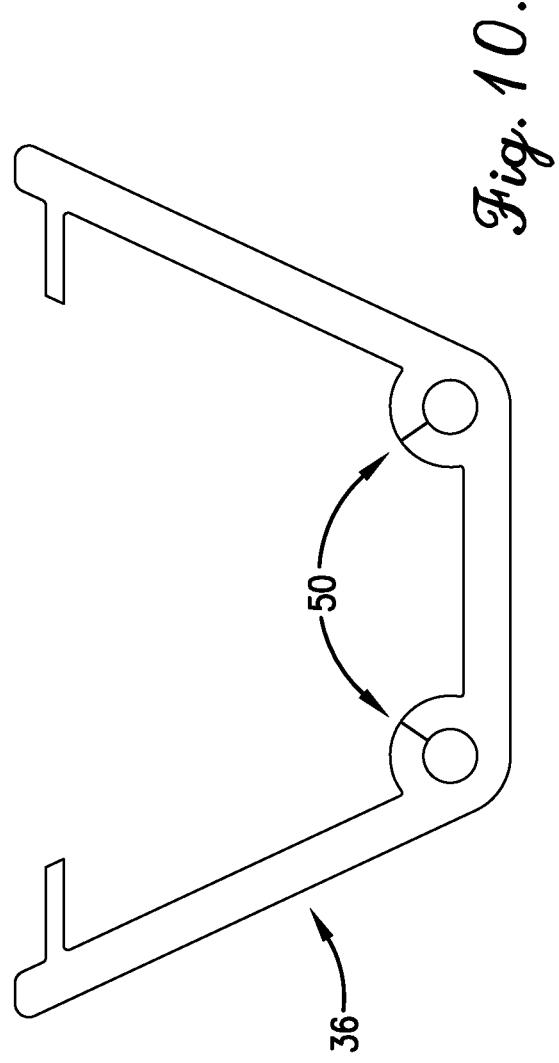

METHOD OF MANUFACTURING FOLDED STRUCTURE WITH ADDITIVE FEATURES

FIELD

The present invention relates to methods of manufacturing three-dimensional structures, and more particularly, embodiments provide a method of manufacturing a multi-sided or otherwise three-dimensional structure as a relatively planar base structure to which is added and/or subtracted features and which is subsequently folded or otherwise physically formed to achieve the three-dimensional structure.

BACKGROUND

In the manufacture of aerospace and other vehicles and structures, it is often desirable to economically manufacture integrated structures while minimizing required secondary joining operations such as welding and fastening. One solution is to begin with a block of raw material having dimensions equal to or greater than the finished structure, and then use subtractive manufacturing technology to remove material from the block until the desired three-dimensional structure is achieved. However this solution is time-consuming and can be wasteful and undesirably expensive. Another solution is to use additive manufacturing to build-up material until the desired three-dimensional structure is achieved. However, this solution is also time-consuming and can encounter limitations creating complex internal components. A third solution is to manufacture several individual pieces, and then use jigs and joining or fastening technologies to position and secure the pieces to achieve the three-dimensional structure. However, this solution is also time-consuming and is highly skill dependent because improper positioning of the jigs and/or employment of the joining or fastening technologies can result in an inaccurate, weak, or otherwise unusable structure.

This background discussion is intended to provide information related to the present invention which is not necessarily prior art.

SUMMARY

Embodiments address the above-described and other problems and limitations in the prior art by providing a method of manufacturing a multi-sided or otherwise three-dimensional structure as a relatively planar base structure to which is added and/or subtracted features to create an intermediate structure which is subsequently folded or otherwise physically formed to achieve the three-dimensional formed structure.

In a first embodiment, a method is provided for manufacturing a three-dimensional formed structure, and the method may comprise the following steps. A base structure may be constructed, and one or more features may be incorporated into the base structure to create an intermediate structure. The intermediate structure may be physically formed to create the three-dimensional formed structure, such that at least one of the features may be located within an internal space defined by the formed structure. One or more joints between two or more sides of the formed structure may be secured to complete the basic build.

Various implementations of the first embodiment may include any one or more of the following features. The base structure may be constructed from wrought plate metal and may include one or more thicker areas associated with one or more attachment points of the formed structure. At least one of the features may be incorporated into the base structure using an additive manufacturing technique. The features may include one or more stiffening ribs configured to physically stiffen the formed structure. Forming the intermediate structure to create the formed structure may include folding the intermediate structure. The intermediate structure may include one or more fold lines which facilitate forming the formed structure by folding the intermediate structure along the fold lines. The method may further include, prior to forming, refining to a tolerance an area of the intermediate structure which may be located within the internal space after forming. Some or all of the joints may be secured by welding or fastening. The method may further include incorporating one or more separately constructed additional elements into the intermediate structure prior to forming or into the formed structure after forming. The separately constructed additional elements may include a bulkhead extending across the internal space. The method may include incorporating a closeout element into the formed structure, and the closeout element may further define and close the internal space.

In a second embodiment, a method is provided for manufacturing a multi-sided formed structure. The method may comprise the following steps. A base structure may be constructed using a first construction technique, and one or more features may be incorporated into the base structure using a second construction technique to create an intermediate structure which may include one or more fold lines. An area of the intermediate structure which will be located within an internal space defined by the formed structure may be refined to a tolerance. The intermediate structure may be folded along the fold lines to create the formed structure having two or more sides, and at least one of the additional features may be located within the internal space defined by the formed structure. One or more joints between the sides of the formed structure may be secured to complete the basic build.

Various implementations of the second embodiment may include any one or more of the following features. The base structure may be constructed from wrought plate metal and may comprise one or more thicker areas associated with one or more attachment points of the formed structure. The second construction technique may be an additive manufacturing technique. The features may include one or more stiffening ribs configured to physically stiffen the formed structure. At least one of the joints may be secured by welding. The method may further include incorporating one or more separately constructed additional elements into the intermediate structure prior to forming or into the formed structure after forming. The method may further include incorporating a closeout element into the formed structure, and the closeout element may further define and close the internal space.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 9 is a fragmentary cross-sectional elevation view of another implementation of two fold-line elements of the intermediate structure of FIG. 2 prior to forming;

FIG. 10 is a fragmentary cross-sectional elevation view of the two fold-line elements of FIG. 9 after forming;

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, embodiments provide a method of manufacturing a multi-sided or otherwise three-dimensional structure as a relatively planar base structure to which is added and/or subtracted features and which is subsequently folded or otherwise physically formed to achieve the three-dimensional structure. More specifically, a multi-sided structure may be created "in-the-flat" using homogeneous and/or hybrid material manufacturing techniques and then subsequently folded or otherwise physically formed to a final shape. Embodiments advantageously reduce the cost, time, and complexity of manufacturing multi-sided or otherwise three-dimensional structures, including facilitating the incorporation of complex internal features and minimizing required secondary joining operations such as welding and fastening. Potential applications include manufacturing higher performance damage tolerant integrated metallic structures, such as may be used in aerospace or other vehicles or structures.

Figure 1:
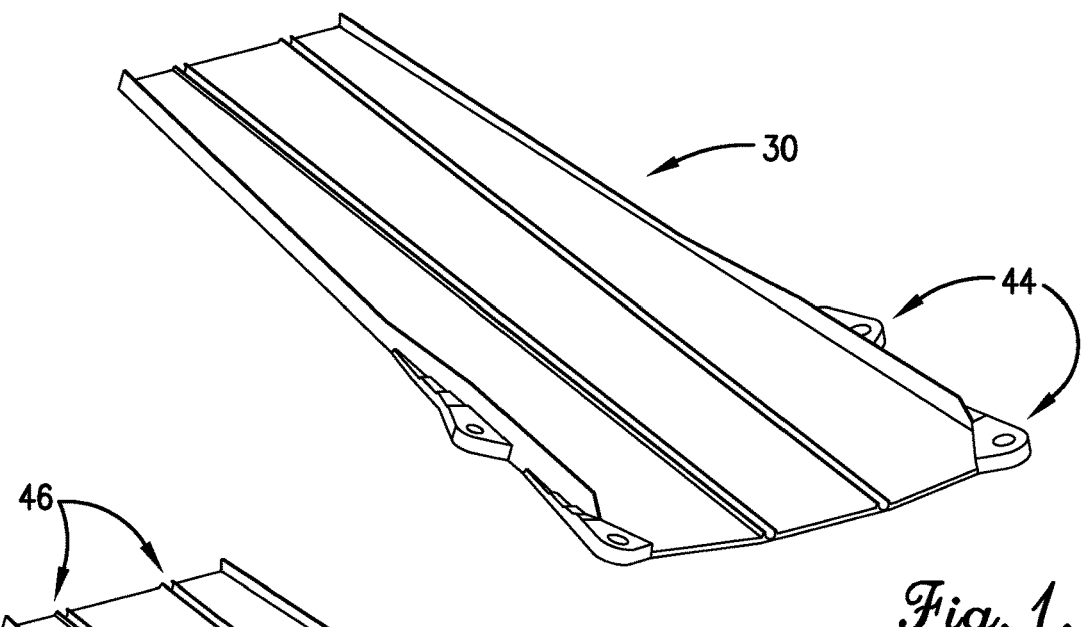
FIG. 1 is an isometric view of an example relatively planar base structure.
Figure 2:
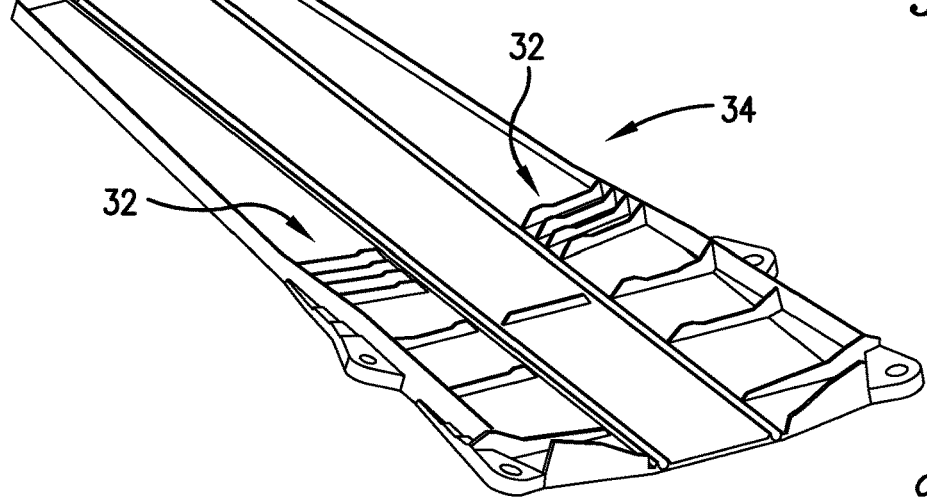
FIG. 2 is an isometric view of example features added to the base structure of FIG. 1 to create an example intermediate structure.
Figure 3:
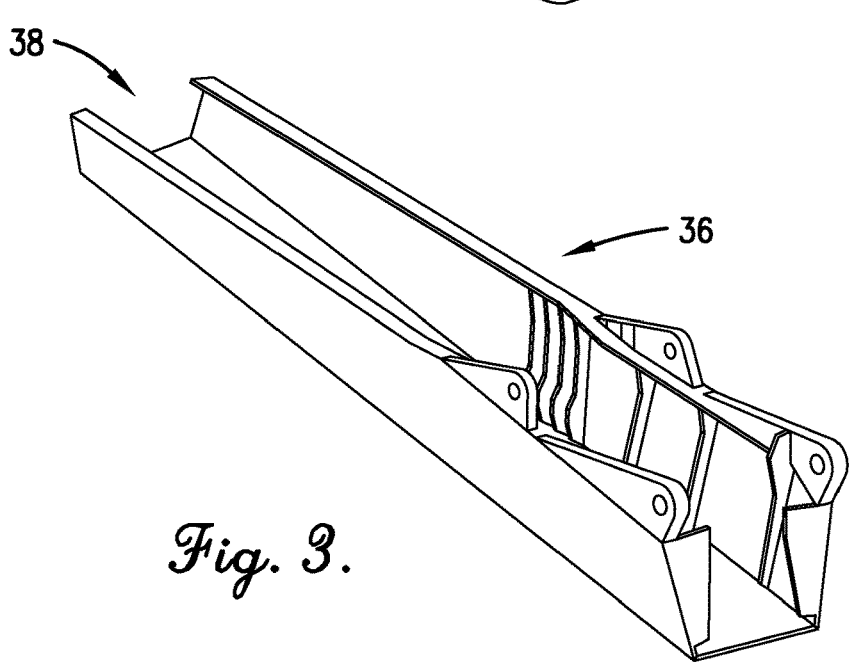
FIG. 3 is an isometric view of the intermediate structure of FIG. 2 physically formed into an example multi-sided or otherwise three-dimensional formed structure.
Figure 11:
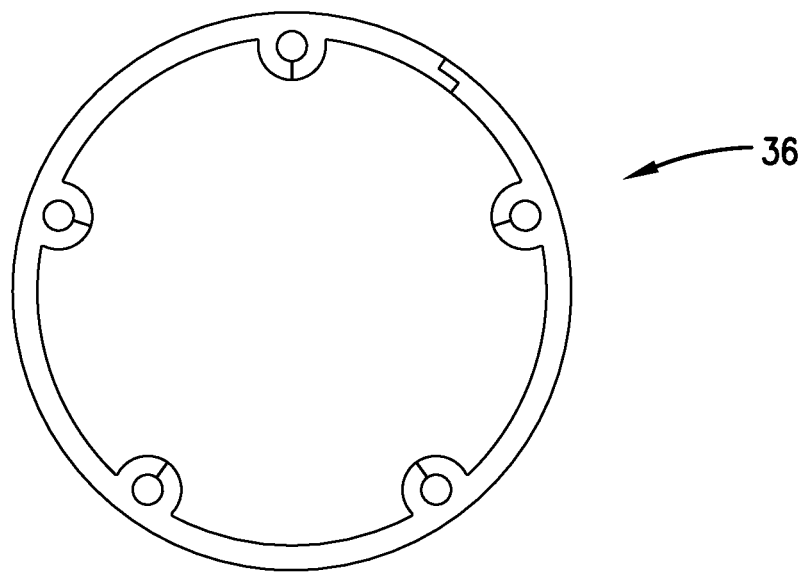
FIG. 11 is a cross-sectional elevation view of another implementation of multiple fold-line elements after forming to create a substantially circular or cylindrical formed structure.
Figure 12:
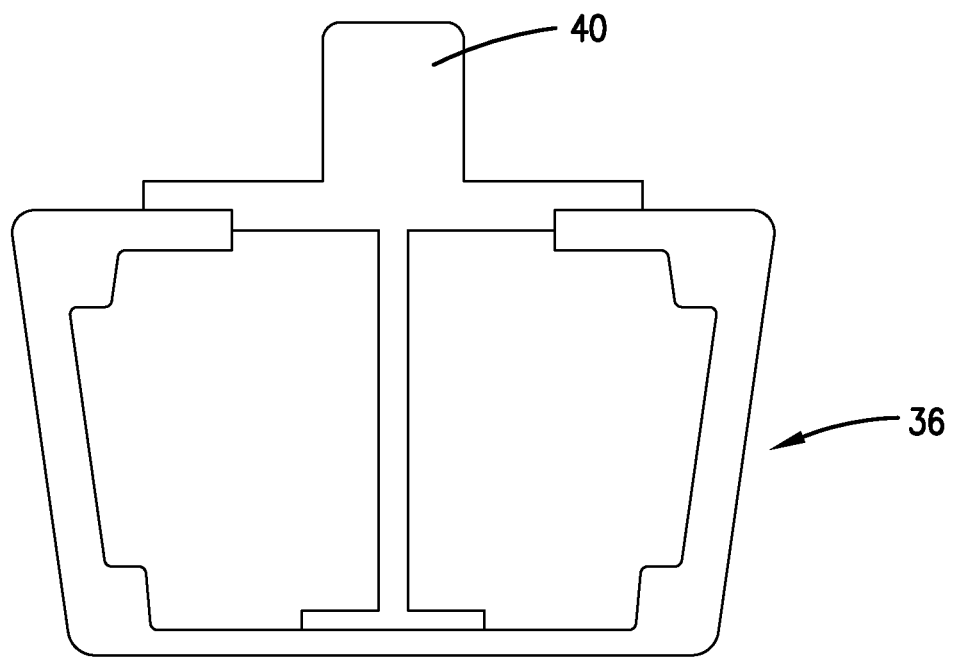
FIG. 12 is a cross-sectional elevation view of the formed structure of FIG. 3 to which has been added a closeout element.

In various example implementations shown in FIGS. 1-12, an initial base structure 30 may be constructed, as seen in FIG. 1; one or more features 32 may be added to, subtracted from, or otherwise incorporated into the base structure 30 to create an intermediate structure 34, as seen in FIG. 2; the intermediate structure 34 may be folded or otherwise physically formed into a multi-sided or otherwise three-dimensional formed structure 36, as seen in FIG. 3, wherein at least one or more of the features 32 may be located within an internal space 38 defined by the formed structure 36, and joints or other connections (e.g., between the sides of the formed structure 36) may be welded, fastened, or otherwise secured. If a closeout element 40, as seen in FIG. 12, is desired or needed, it may be added. At any one or more points in this process, the structures, features, and/or elements may be refined to desired tolerances, especially areas which may be located in the internal space 38 within the formed structure 36 and therefore difficult to access after forming.

In one example implementation, the formed structure 36 may be an aerospace or other vehicle structure, such as an engine pylon. The base structure 30 may be "relatively planar" in comparison to the "relatively three-dimensional" formed structure 36 in that the forming process may increase or add to the dimensionality of the original base structure 30. The base structure 30 may be constructed using a first construction technique, such as physical shaping (the base structure 30 may be, e.g., wrought plate metal), additive manufacturing, or subtractive manufacturing, and at least some of the features 32 may be constructed using a second construction technique which may or may not be different from the first construction technique, such as an additive manufacturing technique in which at least some of the features 32 are deposited onto the base structure 30. This advantageously reduces the needed amount of raw material, as compared to, for example, machining the intermediate or formed structure with the features from a thick plate or forging.

Construction of the base structure 30 may include locating critically loaded interface features 44 within the base material volume. For example, in a pylon these interfaces may include the major wing attach fitting lugs. The width of these lugs may determine the minimum thickness of the base material. If a load bearing requirement is driving the lug thickness, the required thickness of the base material may be further reduced by adding material to one or both sides of the base material using an additive manufacturing technique to provide the required bearing surface area.

Figure 4:
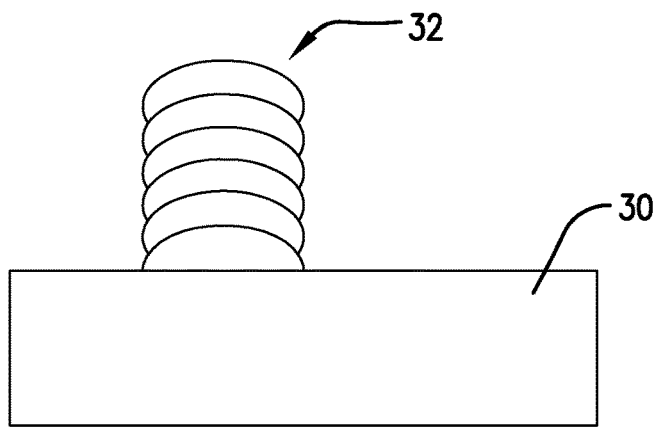
FIG. 4 is a fragmentary cross-sectional elevation view of an example feature added to the base structure during the creation of the intermediate structure of FIG. 2.
Figure 5:
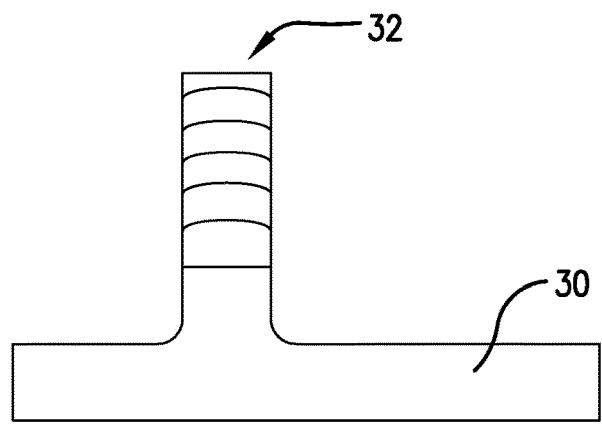
FIG. 5 is a fragmentary cross-sectional elevation view of the intermediate structure of FIG. 4, wherein the feature and the base structure have been refined by removing material.

As seen in FIGS. 4 and 5, at least some of the features 32, such as stiffening ribs, which exceed the base material volume may be built-up (FIG. 4) using an additive manufacturing technique, and then subsequently refined (FIG. 5) to a desired shape or design. One such technique may involve fusion deposition using plasma melt wire. Bulk additive manufacturing techniques may include linear or rotary friction welding, and the bulk materials may include similar, gradated, or hybrid prefabricated forms. Pylon-to-wing attach features are typically thicker than other structural elements. This results in the final machined profile being located within the base material rather than at the added material interface with the base material. As the base of stiffening ribs tend to be higher shearing stress locations, it is advantageous for this feature to be located away from the fusion plane of the added material and the base material. Additionally or alternatively, negative features, such as grooves, openings, or thinner areas, may be created using a subtractive manufacturing technique.

As seen in FIGS. 1, 2, and 7-11, one or more integral features 46 which facilitate folding or other forming of the structure may be incorporated into the base structure 30 or added thereto and/or subtracted therefrom. For example, folding may be facilitated by reducing the cross-sectional thickness of the base structure 30 along one or more fold-lines 46. Folding or other forming may be further facilitated by heating (using, e.g., Joule-forming) the fold-lines 46 or other areas of the intermediate structure 34 prior to folding or other manipulation. Features 48 may be incorporated into one or both sides of fold-line 46 to strengthen the interior joint 50 once the structure 36 is formed. This joint 50 may be consolidated into an integrated structure by fusion welding techniques, such as plasma or electron beam welding. For materials that allow solid-state joining techniques, friction stir welding may be used. A mandrel may be used to aid in forming the joint geometry. This may be a removable tool, a "dissolvable" tool, or a "fly-away" tool. In the case of removable or dissolvable tools, they may facilitate fusion joining of the interior joint by acting as a beam-stopper or splatter shield such as is used in electron beam welding. The fly-away tool may be a metal matrix composite component that is fused or brazed to the structure during forming or post-forming.

Figure 6:
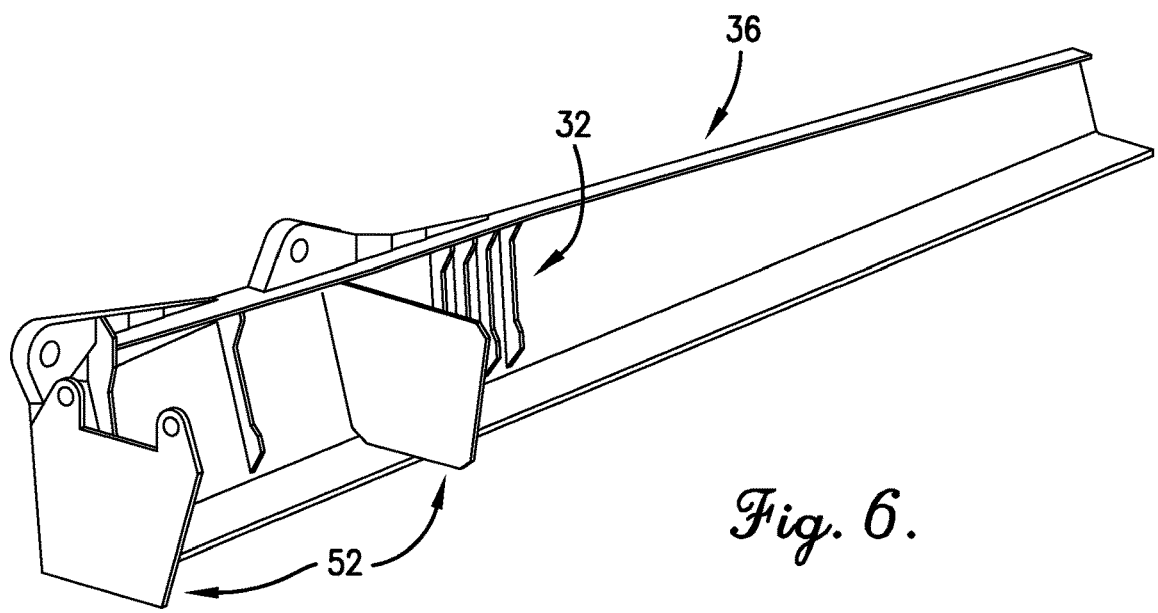
FIG. 6 is a semi-cross-sectional isometric view of the formed structure of FIG. 3 showing separately constructed features added to the formed structure.
Figure 7:
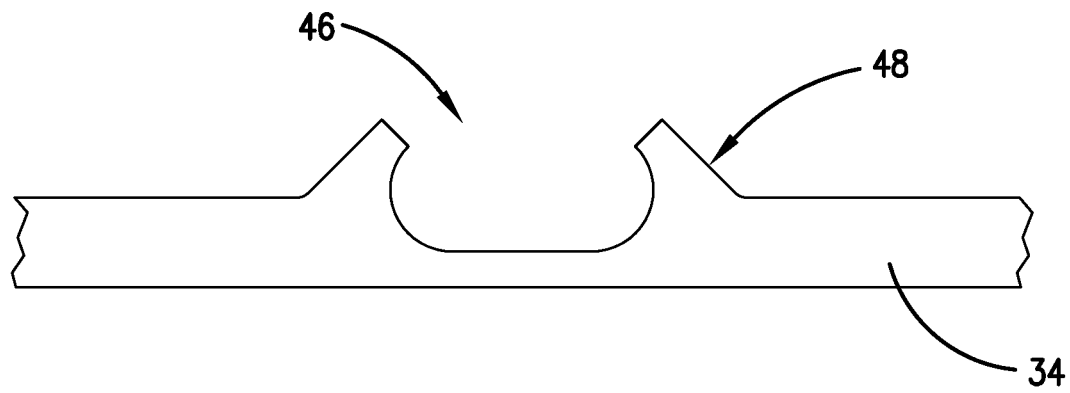
FIG. 7 is a fragmentary cross-sectional elevation view of an implementation of a fold-line element of the intermediate structure of FIG. 2 prior to forming.

Once the structure 36 is folded or otherwise formed, internal features 32 and/or elements may be secured by, e.g., welding or fastening. Some of these may be features 32 which were added to the base structure 30 and which take their final positions once the structure 36 is formed, while, as seen in FIG. 6, others of these elements 52 may be separately fabricated elements, such as bulkheads or ribs, which are introduced during or after forming. As desired or needed, the closeout element 40 may be installed and secured to the formed structure 36 to complete the basic build. At any one or more points in this process, the structures, features, and/or elements may be refined to desired tolerances, especially areas which may be located in the internal space 38 within the formed structure 36 and therefore difficult to access after forming.

Although the main structure configuration has been described and shown using simple plate geometric representations, this geometry could be a partially or fully machined truss or a complete additive manufactured component. Additionally, the internal features may be configured in such a way that they interface with cooperating features, when folded, in a three-dimensional manner. Additionally, features which facilitate attach or mounting of other components may be incorporated prior to forming. One such feature may be threaded studs installed using a fusion process, such as robotic rotary friction welding. Additionally, while depicted as a two-piece structural assembly, the method may be used to fabricate multiple pieces joined along two or more edges or other locations to form a structure of open or closed shape.

Figure 13:
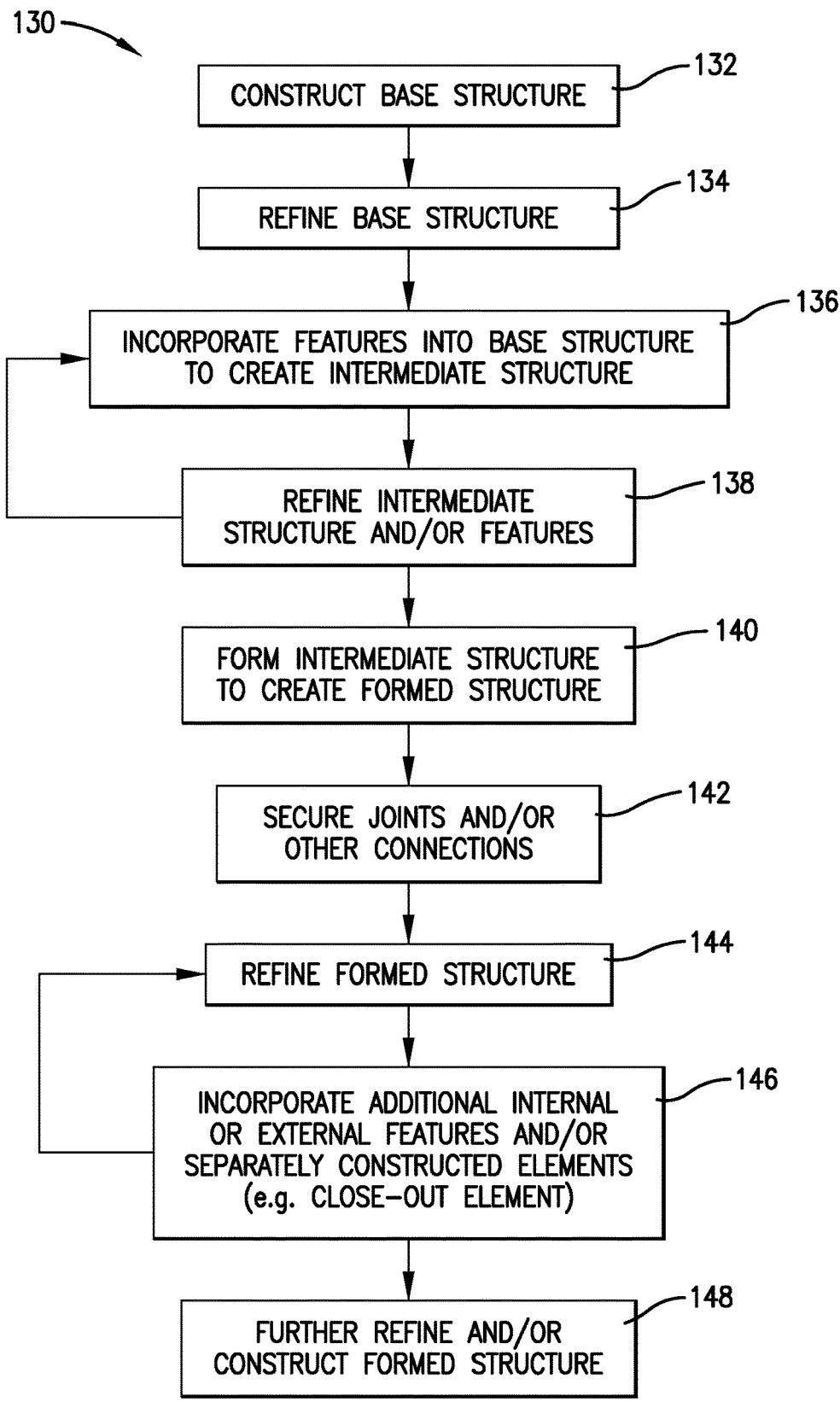
FIG. 13 is a flowchart of steps in an embodiment of a method of manufacturing a multi-sided or otherwise three-dimensional formed structure, wherein the results of various implementations the steps are reflected in FIGS. 1-12.

Referring also to FIG. 13, an embodiment of a method 130 is shown for manufacturing a multi-sided or otherwise three-dimensional formed structure, such as was described above, as a relatively planar base structure to which is added and/or subtracted features and elements and which is subsequently folded or otherwise physically formed to achieve the formed structure. With reference to FIGS. 1-12 and the preceding discussion, the method 130 may include the following steps.

An initial base structure 30 may be constructed, as shown in 132 and FIG. 1. The base structure 30 may be constructed using substantially any suitable base material or materials and substantially any suitable first construction technique, such as physical shaping (the base structure 30 may be, e.g., wrought plate metal), additive manufacturing, or subtractive manufacturing. The base structure 30 may be relatively planar in comparison to the formed structure 36 in that the forming process may increase or add to the dimensionality of the original base structure 30 (as reflected in FIGS. 1-3). In one implementation, the base structure 30 may be constructed of wrought metal. The base structure 30 may be relatively planar or non-planar, may include thicker or otherwise reinforced areas, and may include one or more initially incorporated features 46 (e.g., fold lines or ribs). The base structure 30 and any initially incorporated features 46 may be refined, as shown in 134 and seen in FIG. 1, using substantially any suitable construction technique.

One or more features 32 may be incorporated into the base structure 30 to create an intermediate structure 34, as shown in 136 and seen in FIG. 2. The features 32 may be constructed from substantially any suitable feature material or materials and using substantially any suitable second construction technique which may or may not be different from the first construction technique. For example, as seen in FIGS. 4 and 5, at least some of the features 32 may be constructed using an additive manufacturing technique in which at least some of the features 32 are deposited onto the base structure 30. The features 32 may include, e.g., structural or non-structural elements, fold lines, ribs, bulkheads, attachments, or openings or closings. For example, base material may be removed in order to form or refine fold lines 46, or material may be added to the base structure 30 to build-up ribs or other features. At least one or more of the features 32 may be located within an internal space 38 defined by the formed structure 36. The intermediate structure 34 may be refined, as shown in 138, using substantially any suitable refinement technique. The two prior steps of construction and refinement may be repeated as needed or desired. For example, complex features 32 on the intermediate structure 34 may be constructed through several stages of building and refining.

Figure 8:
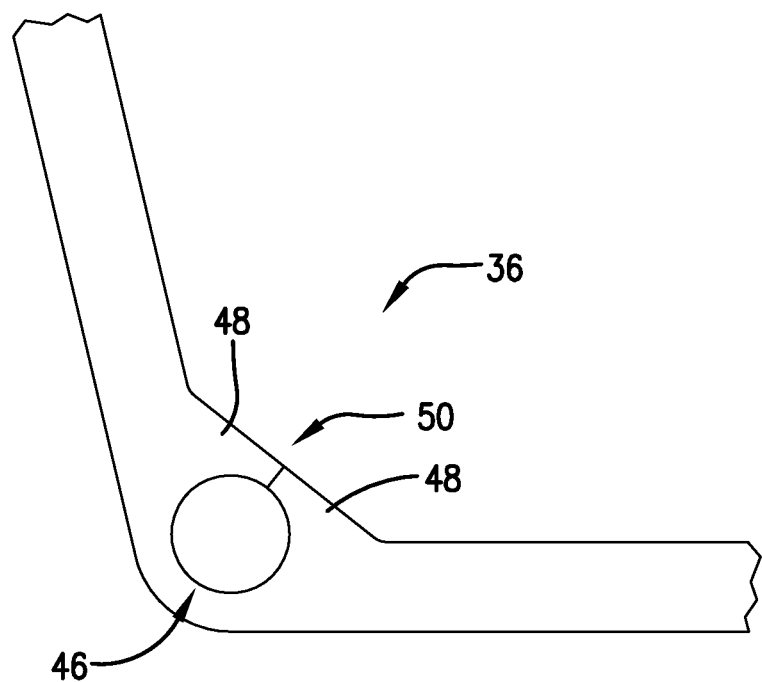
FIG. 8 is a fragmentary cross-sectional elevation view of the fold-line element of FIG. 7 after forming.

The intermediate structure 34 may be physically formed to create a formed structure 36, as shown in 140 and seen in FIG. 3. Forming may involve substantially any suitable action or actions, such as folding, rolling, bending, compressing, or stretching, which may be performed at any suitable temperature (e.g., a higher temperature to soften material and facilitate shaping). For example, as shown in the figures, a relatively planar intermediate structure 34 may be folded to create a multi-sided or otherwise relatively three-dimensional formed structure 36, as seen in FIGS. 8, 10, and 11. Joints 50 and other interfaces and connections may be secured, as shown in 142. Securement may involve substantially any suitable technique, such as welding, fastening, or bonding. The formed structure 36 may be refined, as shown in 144, using substantially any suitable refinement technique.

Any additional internal or external features may be incorporated into the formed structure 36, as shown in 146 and seen in FIG. 6, which may complete the basic build. Additional internal features may include, e.g., bulkheads or frame members, and additional external features may include, e.g., a closeout element 40 (FIG. 12). In some implementations, the formed structure 36 may include an opening allowing access to the interior of the structure, and the closeout element 40 may span this opening to further define or close the internal space 38 or otherwise complete the basic structure. The formed structure 36 may be further refined and/or constructed, as shown in 148, using substantially any suitable refinement technique. This may include, for example, machining critical features to ensure a needed or desired degree of accuracy of tolerance.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method of manufacturing a multi-sided formed engine pylon structure which is a component of an aerospace vehicle, the method comprising:
    constructing a base structure using a first construction technique;
    creating one or more fold lines of reduced cross-sectional thickness in the base structure;
    incorporating one or more additional features into the base structure using an additive manufacturing technique to create an intermediate structure, wherein the one or more additional features include one or more stiffening ribs configured to physically stiffen the multi-sided formed engine pylon structure;
    refining to a tolerance an area of the intermediate structure which will be located within an internal space defined by the multi-sided formed engine pylon structure;
    folding the intermediate structure along the one or more fold lines of reduced cross-sectional thickness to create the multi-sided formed engine pylon structure having two or more sides, wherein at least one of the one or more additional features is located within the internal space defined by the multi-sided formed engine pylon structure;
    welding along the one or more fold lines between the two or more sides of the multi-sided formed engine pylon structure; and
    incorporating a closeout element into the multi-sided formed engine pylon structure, wherein the closeout element further defines and closes the internal space.

2. The method of claim 1, wherein the base structure is constructed from wrought plate metal and comprises one or more thicker areas associated with one or more attachment points of the multi-sided formed engine pylon structure.

3. The method of claim 1, further including incorporating one or more separately constructed additional elements into the intermediate structure prior to forming or into the multi-sided formed engine pylon structure after forming.

4. The method of claim 3, wherein the one or more separately constructed additional elements include a bulkhead extending across the internal space.

* * * * *